United States Patent
Kim et al.

(10) Patent No.: US 7,809,596 B2
(45) Date of Patent: Oct. 5, 2010

(54) APPARATUS AND METHOD FOR EVALUATING INDIRECT LOSS CAUSED BY UBIQUITY EFFECT

(75) Inventors: Tae-Han Kim, Daejon (KR); Eun-Jin Cho, Daejon (KR); Hyun-Mi Baek, Daejon (KR); Jae-Ho Byun, Daejon (KR)

(73) Assignees: Electronics and Telecommunications Research Institute, Daejon (KR); KT Corporation, Kyeonggi-do (KR)

( * ) Notice: Subject to any disclaimer, the term of this patent is extended or adjusted under 35 U.S.C. 154(b) by 1069 days.

(21) Appl. No.: 11/514,472

(22) Filed: Sep. 1, 2006

(65) Prior Publication Data
US 2007/0130033 A1 Jun. 7, 2007

(30) Foreign Application Priority Data
Sep. 5, 2005 (KR) ............... 10-2005-0082084

(51) Int. Cl.
*G06F 17/00* (2006.01)
(52) U.S. Cl. ........................... 705/7; 705/400
(58) Field of Classification Search .......... 705/7, 705/400
See application file for complete search history.

(56) References Cited

U.S. PATENT DOCUMENTS
2004/0054569 A1* 3/2004 Pombo et al. ............ 705/7
2004/0073520 A1* 4/2004 Eskandari .............. 705/400
2009/0106064 A1* 4/2009 Egner et al. .............. 705/7

FOREIGN PATENT DOCUMENTS

| KR | 2000-006846 | 11/2000 |
|---|---|---|
| KR | 102005 0054031 | 6/2005 |

OTHER PUBLICATIONS

Review of the Operation of the Universal Service Obligation and Customer Service Guarantee Parts 2 and 5 of the Telecommunications (Consumer Protection and Service Standards) Act 1999 Department of Communications, Information Technology and the Arts Apr. 7, 2004.*

* cited by examiner

*Primary Examiner*—Susanna M Diaz
*Assistant Examiner*—William E Rankins
(74) *Attorney, Agent, or Firm*—Ladas & Parry LLP

(57) ABSTRACT

Provided are an apparatus for evaluating an indirect loss caused by a ubiquity effect by provision of a universal service, and a method thereof. The apparatus includes a first data storage unit for storing population statistics-related data, a second data storage unit for storing universal service offer-related data, a control unit for reading out and delivering required data from the first and second data storage units to a ubiquity loss calculation unit and controlling the ubiquity loss calculation unit, the ubiquity loss calculation unit for calculating a ubiquity loss of each evaluation object district by using the required data from the control unit, and a third data storage unit for storing the ubiquity loss of each evaluation object district calculated in the ubiquity loss calculation unit.

13 Claims, 3 Drawing Sheets

APPARATUS AND METHOD FOR EVALUATING INDIRECT LOSS CAUSED BY UBIQUITY EFFECT

FIELD OF THE INVENTION

The present invention relates to a ubiquity loss evaluation technique; and more particularly, to an indirect loss evaluating apparatus which evaluates an indirect loss caused by a ubiquity effect generated as a service provider provides a universal service but hardly evaluated in the aspect of accounting, by processing data related to providing of a service and population statistics-related data of the service provider and evaluating a ubiquity loss, and a method thereof.

DESCRIPTION OF RELATED ART

A government designates a service provider to provide a predetermined telecommunications service, which is a kind of universal services, obligatorily pursuant to a related act, and the government forces other loss-sharing service providers of over a predetermined size that do not provide the universal service to share loss of the designated service provider which is generated as the designated service provider provides the universal service. The indirect loss caused by a ubiquity effect, which is ubiquity loss, should be measured to accurately calculate the amount of loss indemnification to be taken by each loss-sharing service provider.

In other words, according to the Telecommunications Business Act and other related acts, all telecommunications carriers are obligated to provide a universal service or indemnify for a loss caused by providing the universal service. Specifically, a telecommunications carrier designated by the government provides the universal service, while other telecommunications carriers indemnify for loss generated from the provision of the service.

The loss is calculated only for high cost districts where a cost for providing a service exceeds income, except for deficit areas within low cost districts where income acquired from providing the same service exceeds the cost. The deficit areas include a single-household residential area in a metropolitan area.

Therefore, when the loss is calculated only in the high cost districts, a loss that is caused on the part of the designated service provider when a subscriber moves from a high cost district to deficit areas, that is, an indirect loss generated by the ubiquity effect, should also be considered as well as loss in accounting.

In addition to the indirect loss, when subscribers move from the high cost districts to surplus areas within the low cost districts, the ubiquity effect also gives an indirect benefit, implying that the designated service provider's income is increased due to a tendency that subscribers prefer a service provider that they have joined before. A method of calculating an indirect benefit based on the ubiquity effect is disclosed in an OVUM's report submitted to the Australian Communications Authority (ACA), which is now changed to the Australian Communications and Media Authority in charge of regulating Australian telecommunications industry.

However, this report presents no mention on a construction of a network system for measuring the indirect benefit. Accordingly, the authority did not adopt the report since various basic data required for measurement are mostly based on assumptions.

On the other hand, no act is legislated on measurement of indirect loss generated due to the ubiquity effect till now, and no documentary evaluation method exists. Consequently, it is required to measure the indirect loss based on the ubiquity effect to evaluate the amount of loss indemnification caused by the provision of the universal service. Only after the indirect loss is measured, the loss of each high cost district can be calculated more precisely.

SUMMARY OF THE INVENTION

It is, therefore, an object of the present invention to provide an apparatus for evaluating an indirect loss evaluating apparatus which evaluates an indirect loss caused by a ubiquity effect generated as a service provider provides a universal service but hardly evaluated in the aspect of accounting, by processing data related to providing of a service and population statistics-related data of the service provider and evaluating a ubiquity loss, and a method thereof.

In accordance with one aspect of the present invention, there is provided an apparatus for evaluating an indirect loss caused by a ubiquity effect by provision of a universal service, including: a first data storage unit for storing population statistics-related data; a second data storage unit for storing universal service offer-related data; a control unit for reading out and delivering required data from the first and second data storage units to a ubiquity loss calculation unit and controlling the ubiquity loss calculation unit; the ubiquity loss calculation unit for calculating a ubiquity loss of each evaluation object district by using the required data from the control unit; and a third data storage unit for storing the ubiquity loss of each evaluation object district calculated in the ubiquity loss calculation unit.

In accordance with another aspect of the present invention, there is provided a method of evaluating an indirect loss caused by a ubiquity effect by provision of a universal service, including the steps of: dividing all districts into low cost districts, which are ubiquity effect districts, and high cost districts, which are evaluation object districts, based on income and cost data of each district; finding competition introduction districts among the divided ubiquity effect districts by using a total market share of a service provider in the ubiquity effect districts; matching one competition introduction district with one evaluation object district to calculate a ubiquity loss; matching all competition introduction districts with one evaluation object district to calculate a ubiquity loss; repeatedly performing the matching steps for all the divided evaluation object districts; and storing the ubiquity loss by evaluation object districts.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
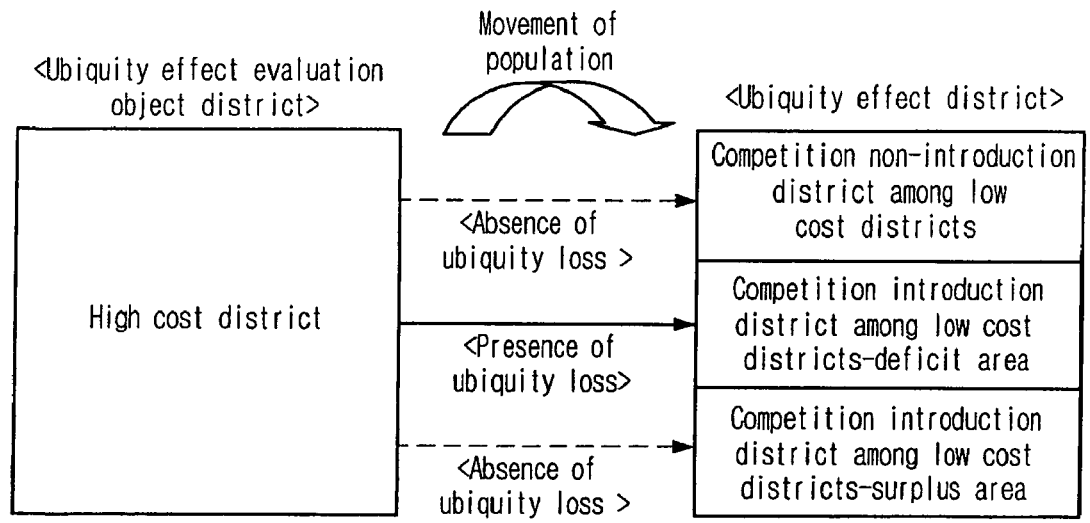
FIG. 1 illustrates a ubiquity loss used in the present invention.

The above-mentioned objectives, features, and advantages will be more apparent by the following detailed description associated with the accompanying drawings. Thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

First of all, a variety of terms used herein will be defined below, prior to describing the preferred embodiments of the present invention.

1. The term "ubiquity service" implies a basic telecommunications service that all users can receive at a proper charge anytime and anywhere. It is preferable to apply a ubiquity loss concept to "local telephone service" among diverse universal services stated in the related act.

2. The term "universal service provider" denotes a service provider having a duty to provide the universal service according to the Telecommunications Business Act and other related acts.

3. The term "loss-sharing service provider" implies a service provider having a duty to indemnify for loss caused by provision of the universal service according to the act related to the telecommunications business act.

4. The term "district" is referred to as a call area that becomes a basis of loss indemnification amount evaluation of the universal service by provision of the local telephone service.

5. The term "high cost district" means a district where a cost required for provision of the universal service exceeds income.

6. The term "low cost district denotes a district that income by provision of the universal service exceeds the required cost.

7. The term "area" is referred to as a lower concept of the district, wherein one district is divided into an apartment area and a non-apartment area and a plurality of areas constitute one district.

8. The term "competition introduction district" indicates a district where loss-sharing service providers provide a service associated with the universal service.

9. The term "ubiquity effect" implies a tendency that subscribers prefer a telecommunications carrier the subscribers joined before although the subscribers move from the high cost district to the competition-introduced low cost district.

10. The term "loss by a ubiquity effect (ubiquity loss)" means a loss that the universal service provider does not receive preservation by the ubiquity effect when subscribers move from a high cost district to a deficit area within the competition-introduced low cost district.

11. The term "weighted average cost of capital" is referred to as a value that is made by weighted-averaging a cost of equity capital and a cost of borrowing capital. It is used as a basis of a company's investment decision and also used as a discount rate to exchange a future cash flow into a current value.

FIG. 1 shows a ubiquity loss used in the present invention.

As shown, it is first assumed that a subscriber who resides in a high cost district where a total cost exceeds a total income, that is, in a ubiquity effect evaluation object district moves to a deficit area within a competition introduction district where other telecommunications carriers also provide a service among low cost districts or ubiquity effect districts where a total income exceeds a total cost. The deficit area used herein denotes an area where a total cost therein exceeds a total income. In this assumption, in case where the subscriber continues to join a service provider he/she joined before moving, a deficit of the service provider is increased due to the ubiquity effect but the deficit is not indemnified for. Thus, a ubiquity loss occurs because the total income of the corresponding low cost district exceeds the total cost.

However, in case where a subscriber moves from the high cost district where a total cost exceeds a total income to a deficit area within a competition non-introduction district where other telecommunications carriers do not provide a service among the low cost districts, a ubiquity loss does not occur because the subscriber does not select any provider. Meanwhile, in case where the subscriber moves to a surplus area where a total income therein exceeds a total cost although moved to the competition introduction district among the low cost districts, the subscriber gives a profit to the service provider, thus causing no ubiquity loss.

Figure 2:
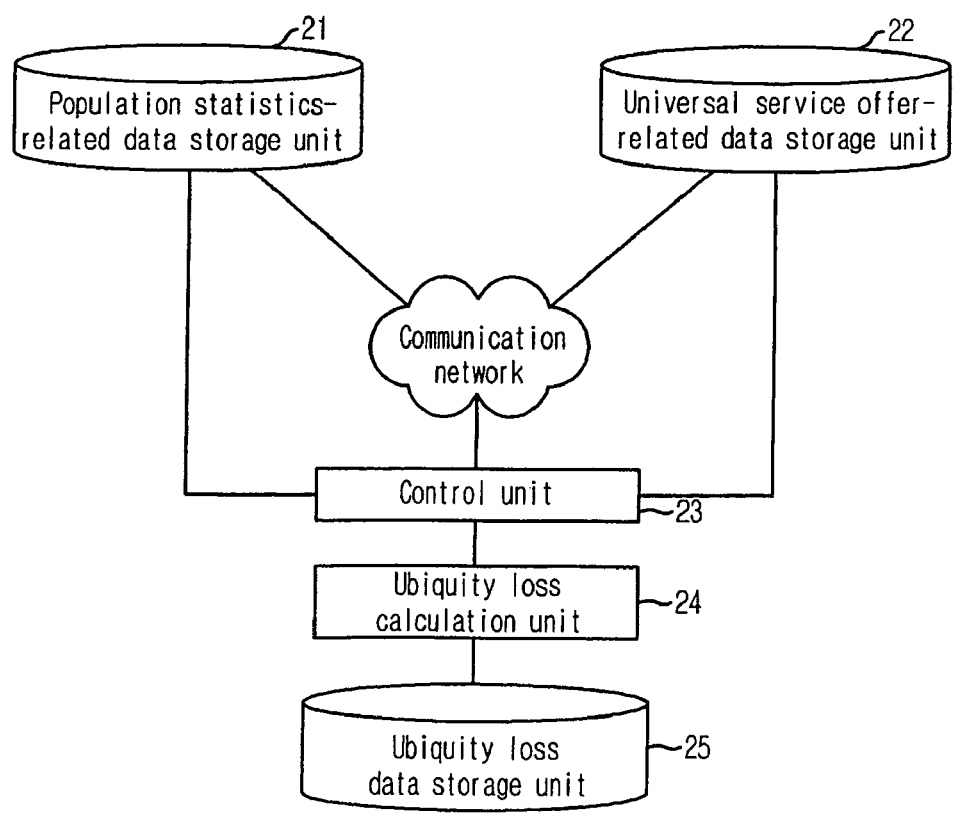
FIG. 2 shows a configuration of an indirect loss evaluating apparatus in accordance with an embodiment of the present invention.

FIG. 2 is a view illustrating a configuration of an apparatus for evaluating an indirect loss caused by a ubiquity effect by provision of a universal service in accordance with an embodiment of the present invention.

As shown, the inventive indirect loss evaluation apparatus includes a population statistics-related data storage unit 21 for storing population statistics-related data such as the number of people of each district, data about the movement of population of each district, and a population ratio by residence types, a universal service offer-related data storage unit 22 for storing universal service offer-related data such as the number of subscribers of each district and residence types, income, cost, a market share, and a weighted-average cost of capital, a control unit 23 for reading out and delivering required data from the storage units 21 and 22 to a ubiquity loss calculation unit 24 and controlling the unit 24, the ubiquity loss calculation unit 24 for calculating a ubiquity loss using the data provided by the control unit 23, and a ubiquity loss data storage unit 25 for storing the ubiquity loss by evaluation object districts calculated by the ubiquity loss calculation unit 24.

To be specific, the population statistics-related data storage unit 21 stores the number of people who have moved from an evaluation object district to a ubiquity effect district, the total number of people of the evaluation object district, and residence ratio information of non-apartment in the ubiquity effect district.

The universal service offer-related data storage unit 22 stores a total required cost of non-apartment in the ubiquity effect district, a total income, the total number of subscribers, a market share of a service provider, a total market share of provider in the ubiquity effect district, and information on the number of subscribers in the evaluation object district.

If the population statistics-related data storage unit 21 and the universal service offer-related data storage unit 22 are managed by an external population statistics management system and universal service management system, respectively, the control unit 23 accesses to those systems over a communication network and performs an authentication procedure. After that, it can read out required data from the population statistics-related data storage unit 21 and the universal service offer-related data storage unit 22.

On the other hand, if the population statistics-related data storage unit 21 and the universal service offer-related data storage unit 22 are provided in the indirect loss evaluation apparatus of the present invention, the control unit 23 can read out the data immediately, without any complicated process.

Figure 3:
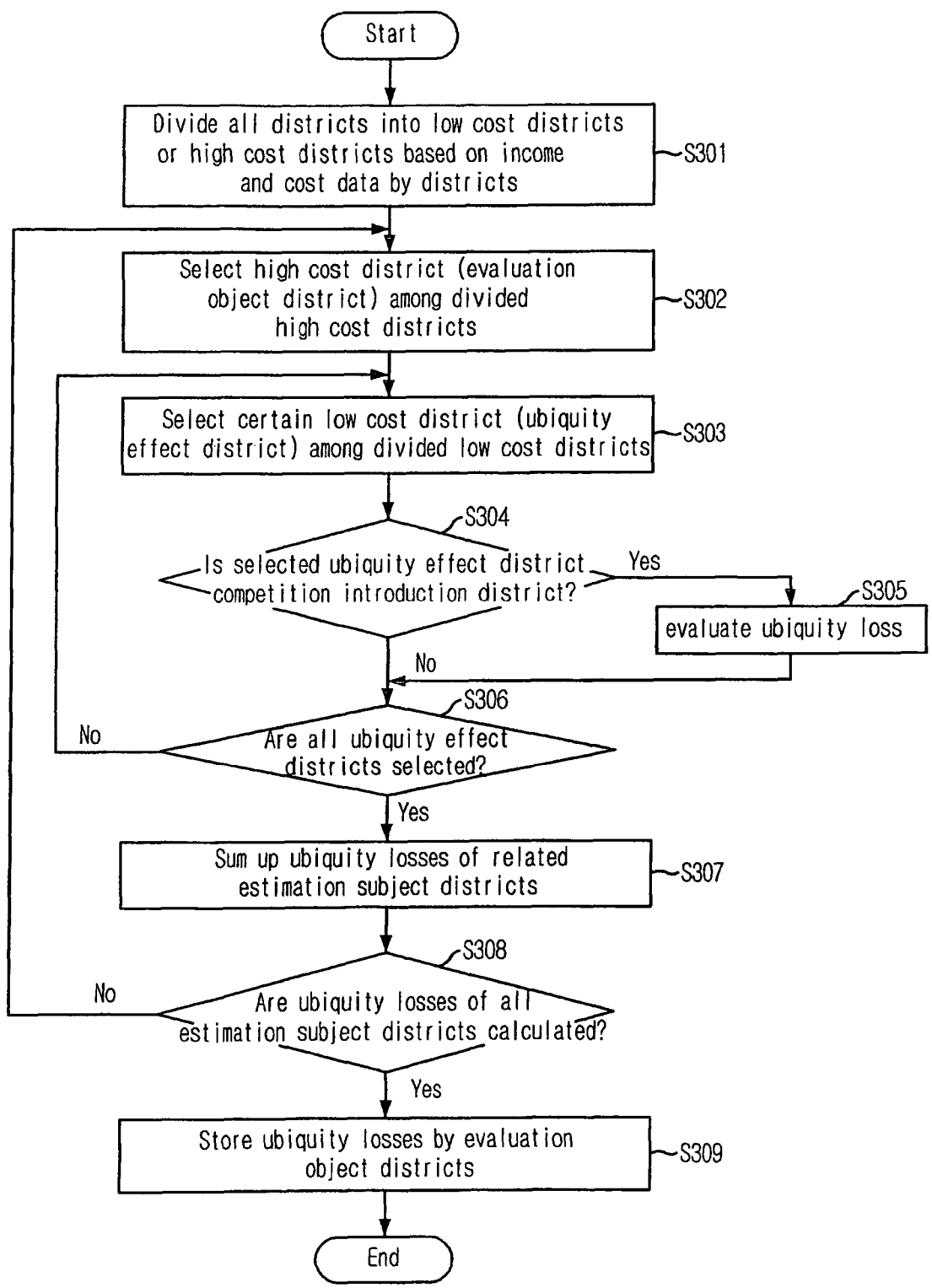
FIG. 3 is a flowchart describing an indirect loss evaluating method in accordance with an embodiment of the present invention.

FIG. 3 is a flowchart illustrating a method of evaluating an indirect loss caused by a ubiquity effect by provision of a universal service in accordance with an embodiment of the present invention.

First, all districts are divided into low cost districts and high cost districts based on the income and cost data of each district stored in the universal service offer-related data storage unit 22 at step S301. Specifically, the low cost districts are districts where income exceeds cost, wherein a net profit can be obtained by subtracting the cost from the income. In contrast, the high cost districts are districts where the cost exceeds the income, wherein a net loss can be obtained by subtracting the income from the cost.

Then, the process of the present invention matches the low cost districts with the high cost districts, respectively, to judge whether a ubiquity loss occurs; and then the ubiquity loss is evaluated.

To be more specific, an arbitrary high cost district, for example, an evaluation object district is first selected among the divided high cost districts at step S302.

Next, an arbitrary low cost district, for example, a ubiquity effect district is chosen out of the divided low cost districts at step S303.

At step S304, it is checked whether the selected ubiquity effect district is a competition introduction district.

If so, a ubiquity loss is evaluated at step S305. In other words, if the selected ubiquity effect district is the competition introduction district, a ubiquity loss associated with the subscriber who moved to the selected ubiquity effect district is evaluated by the selected evaluation object district.

If it is not the competition introduction district, no ubiquity loss is evaluated. That is, if the selected ubiquity effect district is not the competition introduction district, the ubiquity loss is not evaluated since no ubiquity effect is existed therein.

Subsequently, it is checked at step S306 whether all the ubiquity effect districts are selected.

If it is checked at step S306 that all the ubiquity effect districts are not selected, the process returns to the step S303 to perform the subsequent steps. Otherwise, if all the ubiquity effect districts are selected, the process matches all the ubiquity effect districts with one evaluation object district to sum up all of the evaluated ubiquity loss at step S307.

At a next step S308, it is checked whether the ubiquity loss is evaluated with respect to all the evaluation object districts.

If not, the process returns to step S302 to carry out the subsequent steps; and if the ubiquity loss is evaluated with respect to all the evaluation object districts, the process stores the ubiquity loss by evaluation object districts at step S309.

To sum up, it is first checked whether there are any ubiquity effect districts where the ubiquity loss is not evaluated with respect to a target evaluation object district, that is, whether the ubiquity loss is all evaluated with respect to the target evaluation object district. If the ubiquity loss is all evaluated, the ubiquity loss of the target evaluation object district is evaluated by summing up all the ubiquity loss by ubiquity effect districts associated with the target evaluation object district. If there are any ubiquity effect districts that are not evaluated yet, the process selects those ubiquity effect districts and then evaluates a ubiquity loss thereof.

As described above, if the ubiquity loss is evaluated with respect to one evaluation object district, the process judges whether the ubiquity loss evaluation of all the evaluation object districts is completed. If the ubiquity loss evaluation of all the evaluation object districts is completed, the process sends the ubiquity loss by evaluation object districts to the ubiquity loss data storage unit 25. If there are any evaluation object districts where the ubiquity loss evaluation are not completed yet, the process selects those evaluation object districts and then evaluates a ubiquity loss thereof.

Figure 4:
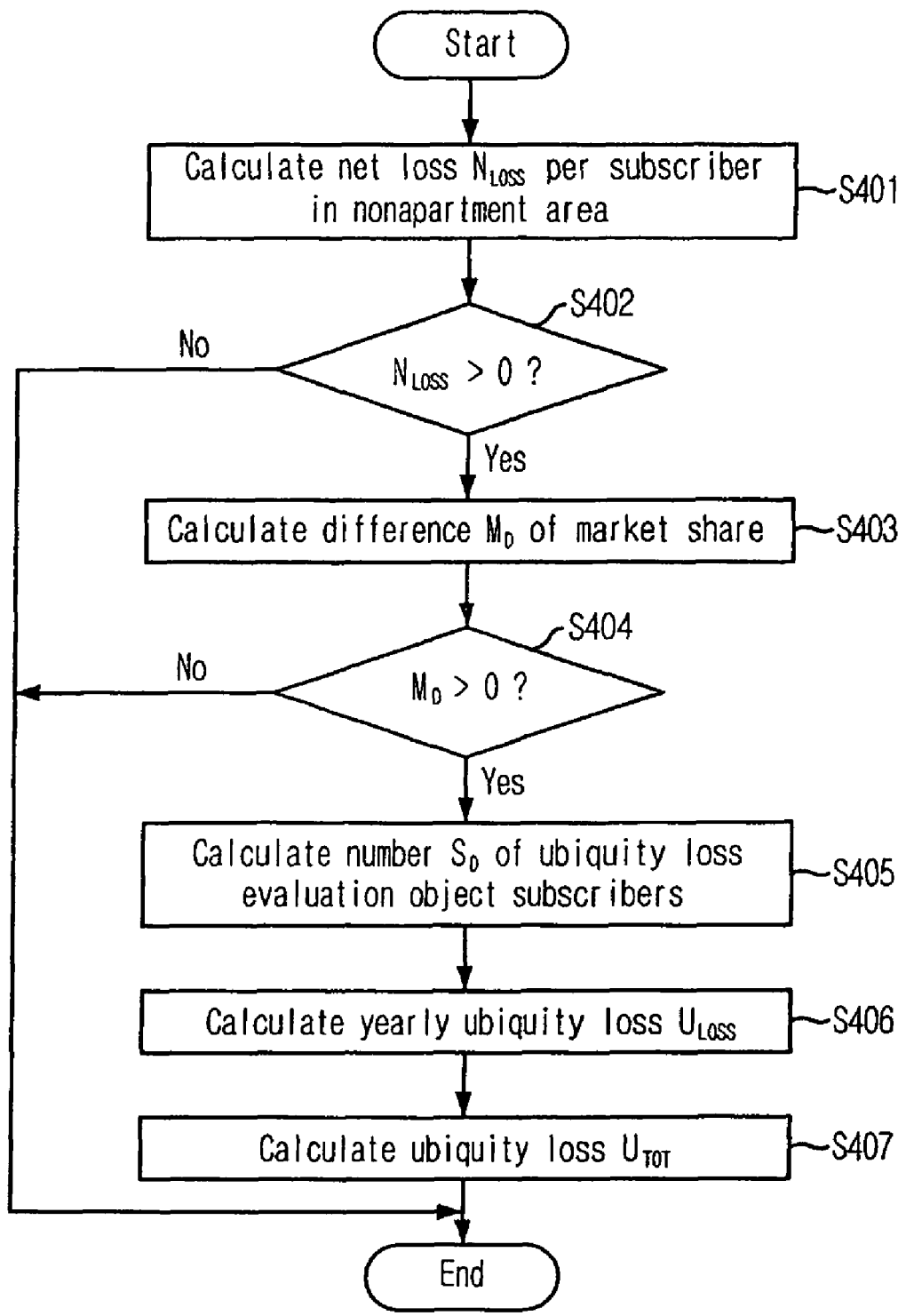
FIG. 4 is a flowchart describing a procedure for calculating an indirect loss in accordance with an embodiment of the present invention.

FIG. 4 shows a flowchart describing a procedure for evaluating an indirect loss caused by a ubiquity effect by provision of a universal service in accordance with an embodiment of the present invention.

First, a non-apartment area is assumed to be a deficit area where a line installation cost and a maintenance fee per subscriber are high. Under the assumption, at a step S401, a net loss $N_{LOSS}$ per subscriber in the non-apartment area is calculated as follows:

$$N_{LOSS}=(C_{NONAPT}-R_{NONAPT})/S_{NONAPT} \quad \text{Eq. (1)}$$

wherein $C_{NONAPT}$ denotes a total required cost of a non-apartment area in a target ubiquity effect district, $R_{NONAPT}$ indicates a total income of the non-apartment area in the target ubiquity effect district, and $S_{NONAPT}$ is the total number of subscribers of the non-apartment area in the target ubiquity effect district.

At step S402, if the net loss per subscriber is not greater than 0, a corresponding area is not a deficit one. Therefore, a ubiquity loss evaluation is ended. If the net loss per subscriber is greater than 0, a corresponding area is a deficit one; and thus, the following step is carried out.

At step S403, a difference $M_D$ of market shares is calculated based on:

$$M_D=M_{NONAPT}-M_{TOT} \quad \text{Eq. (2)}$$

where $M_{NONAPT}$ denotes a market share of a service provider in a non-apartment area of a target ubiquity effect district and $M_{TOT}$ indicates a total market share of the service provider in the target ubiquity effect district.

At step S404, if the difference of market shares is not greater than 0, a corresponding area is an area without ubiquity effect. Thus, the ubiquity loss evaluation is ended. If the difference of market shares is greater than 0, a corresponding area is a deficit one with ubiquity effect. Thus, the following steps are conducted.

At step S405, the number of ubiquity loss evaluation object subscribers, $S_D$, is computed based on:

$$S_D=S_O*P_{OD}/P_o*R_{NONAPT}*M_{D_E} \quad \text{Eq. (3)}$$

where $s_o$ denotes the number of subscribers in a target evaluation object district; $P_{oD}$ indicates the number of people who have moved to a ubiquity effect district in the target evaluation object district; $P_o$ means the total number of populations in the target evaluation object district; $R_{NONAPT}$ represents a residence rate in a non-apartment area of the target ubiquity effect district; and $M_D$ indicates the difference of market shares defined in the Eq. (2).

At a following step S406, a yearly ubiquity loss $U_{LOSS}$ is calculated based on:

$$U_{LOSS}=S_D*N_{LOSS} \quad \text{Eq. (4)}$$

where $S_D$ indicates the number of ubiquity loss evaluation object subscribers defined in the Eq. (3), and $N_{LOSS}$ means the net loss per subscriber defined by the Eq. (1).

At step S407, a ubiquity loss $U_{TOT}$ associated with the target evaluation object district and ubiquity effect district is obtained based on Eq. (5):

$$U_{TOT}=(1+WACC)/WACC*U_{LOSS} \quad \text{Eq. (5)}$$

where WACC denotes a weighted average cost of capital, and $U_{LOSS}$ means the yearly ubiquity loss defined by the Eq. (4).

If it is assumed that the yearly ubiquity loss is continued eternally, a sum of current values of the yearly ubiquity loss becomes an infinite geometric series, in which a start term is $U_{LOSS}$, a common ratio is 1/(1+WACC), and the infinite series is converged to a value as given by the Eq. (5).

As mentioned above, the present invention has an advantage that it can evaluate an indirect loss that is difficult to evaluate in the aspect of account and suffered from a ubiquity effect caused by provision of a universal service by a service provider who should provide the universal service by processing service offer-related data and population statistics-related data of the service provider to evaluate a ubiquity loss.

In addition, the present invention can efficiently and easily compute the total amount that a service provider should receive to cover up the loss, reduce a cost required in connection therewith, and minimize any trouble that may occur between telecommunications carriers, by processing service offer-related data and population statistics-related data of the service provider who provides a universal service to evaluate a ubiquity loss.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-82084, filed with the Korean Intellectual Property Office on Sep. 5, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for evaluating an indirect loss caused by a ubiquity effect by provision of a universal service, comprising :
a first data storage unit for storing population statistics-related data;
a second data storage unit for storing universal service offer-related data;
a control unit for reading out and forwarding required data from the first and second data storage units to a ubiquity loss calculation unit and controlling the ubiquity loss calculation unit;
the ubiquity loss calculation unit for calculating a ubiquity loss of evaluation object districts by using the required data from the control unit, wherein the ubiquity loss calculation unit is programmed to:
divide all districts into low cost districts, which are ubiquity effect districts, and high cost districts, which are evaluation object districts, based on income and cost data of each district;
divide the ubiquity effect districts into competition introduction districts by using a total market share of a service provider in the ubiquity effect districts;
match the low cost districts with the high cost districts, individually; and
judge an issuance of ubiquity loss to thereby calculate a ubiquity loss and a third data storage unit for storing the ubiquity loss of each evaluation object district calculated in the ubiquity loss calculation unit.

2. The apparatus as recited in claim 1, wherein the ubiquity loss calculation unit calculates a net loss per subscriber in a deficit area; calculates a difference of market shares when the net loss per subscriber is greater than 0, calculates the number of ubiquity loss calculation object subscribers when the difference of market shares is greater than 0; calculates an yearly ubiquity loss based on the calculated net loss per subscriber and number of ubiquity loss calculation object subscribers; and calculates a ubiquity loss associated with a corresponding evaluation object district and ubiquity effect district by using the calculated yearly ubiquity loss.

3. The apparatus as recited in claim 2, wherein the first data storage unit stores population statistics-related data containing the number of people of each district, data about the movement of population of each district, and population ratio information of each residence type, the population statistics-related data further containing the number of people who have moved from an evaluation object district to a ubiquity effect district, the total number of people of the evaluation object district, and residence ratio information of a deficit area in the ubiquity effect district.

4. The apparatus as recited in claim 2, wherein the second data storage unit stores universal service offer-related data containing the number of subscribers of each district and residence type, income, cost, market share, and information on weighted average cost of capital, the universal service offer-related data further containing a total required cost of a deficit area in the ubiquity effect district, a total income, a total number of subscribers, a market share of a service provider, a total market share of the service provider in the ubiquity effect district, and information on the number of subscribers in the evaluation object district.

5. A computer-implemented method of evaluating an indirect loss caused by a ubiquity effect by provision of a universal service, comprising the steps of:
(a) retrieving, by a control unit, data from a first and second data storage unit over a communication network wherein the data in the first data storage unit comprises population statistics-related data for call area districts;
(b) forwarding, by the control unit, the first and second data to a calculation unit;
(c) dividing, by the calculation unit, all districts into low cost districts, which are ubiquity effect districts, and high cost districts, which are evaluation object districts, based on income and cost data of each district;
(d) dividing, by the calculation unit, the divided ubiquity effect districts into competition introduction districts by using a total market share of a service provider in the ubiquity effect districts;
(e) matching, by the calculation unit, one competition introduction district with one evaluation object district to calculate a ubiquity loss;
(f) matching, by the calculation unit, all the competition introduction districts with one evaluation object district to calculate a ubiquity loss;
(g) repeatedly performing the matching steps for all the divided evaluation object districts; and
(h) storing the ubiquity loss by evaluation object districts in a third data storage unit.

6. The method as recited in claim 5, wherein the step (a) classifies districts where income exceeds a required cost as low cost districts, and classifies districts where the required cost exceeds income as high cost districts.

7. The method as recited in claim 5, wherein the step (c) includes the steps of:
(c1) calculating a net loss per subscriber of a deficit area;

(c2) calculating a difference of market shares when the calculated net loss per subscriber is greater than 0;

(c3) calculating the number of ubiquity loss calculation object subscribers when the calculated difference of market shares is greater than 0;

(d) calculating an yearly ubiquity loss based on the calculated net loss per subscriber and number of ubiquity loss calculation object subscribers; and (e) calculating a ubiquity loss associated with a corresponding evaluation object district and ubiquity effect district by using the calculated yearly ubiquity loss.

8. The method as recited in claim 7, wherein the net loss per subscriber, $N_{LOSS}$, is calculated by using the following:

$$N_{LOSS} = (C_{NONAPT} - R_{NONAPT})/S_{NONAPT}$$

where $C_{NONAPT}$ denotes a total required cost of a deficit area in a ubiquity effect district, $R_{NONAPT}$ indicates a total income of the deficit area in the ubiquity effect district, and $S_{NONAPT}$ is the total number of subscribers of the deficit area in the ubiquity effect district.

9. The method as recited in claim 7, wherein the difference of market shares, $M_D$, is obtained by:

$$M_D = M_{NONAPT} - M_{TOT}$$

where $M_{NONAPT}$ denotes a market share of a service provider in a deficit area of a ubiquity effect district and $M_{TOT}$ indicates a total market share of the service provider in the ubiquity effect district.

10. The method as recited in claim 7, wherein the number of ubiquity loss calculation subscribers, $S_D$, is calculated as:

$$S_D = S_0 * P_{OD}/P_0 * R_{NONAPT} * M_D$$

where $S_0$ denotes the number of subscribers in an evaluation object district, $P_{OD}$ indicates the number of people who have moved to a ubiquity effect district in the evaluation object district, $P_0$ means the total number of populations in the evaluation object district, $R_{NONAPT}$ means a residence rate in a deficit area of the ubiquity effect district, and $M_D$ indicates a difference of market shares.

11. The method as recited in claim 7, wherein the yearly ubiquity loss $U_{LOSS}$ is computed based on:

$$U_{LOSS} = S_D * N_{LOSS}$$

where $S_D$ indicates the number of ubiquity loss evaluation object subscribers as defined in the claim 10, and $N_{LOSS}$ means the net loss per subscriber as defined in the claim 8.

12. The method as recited in claim 7, wherein the ubiquity loss associated with the evaluation object district and ubiquity effect district, $U_{TOT}$, is derived based on:

$$U_{TOT} = (1 + WACC)/WACC * U_{LOSS}$$

where WACC denotes a weighted average cost of capital, and $U_{LOSS}$ means the yearly ubiquity loss.

13. The method as recited in claim 12, wherein if the yearly ubiquity loss is continued eternally, a sum of current values of the yearly ubiquity loss becomes an infinite geometric series, in which a start term is $U_{LOSS}$, a common ratio is $1/(1+WACC)$, and the infinite series is converged.

* * * * *